United States Patent [19]

Case

[11] 4,386,414
[45] May 31, 1983

[54] DATA PROCESSING SYSTEM UTILIZING A HOLOGRAPHIC OPTICAL ELEMENT

[75] Inventor: Steven K. Case, St. Louis Park, Minn.

[73] Assignee: The Regents of the University of Minnesota, Minneapolis, Minn.

[21] Appl. No.: 208,178

[22] Filed: Nov. 19, 1980

[51] Int. Cl.³ .......................... G06G 9/00; G06F 7/56
[52] U.S. Cl. ..................................... 364/826; 364/713
[58] Field of Search ............... 364/826, 827, 837, 845, 364/713, 726; 324/77 K; 350/3.82

[56] References Cited

U.S. PATENT DOCUMENTS

| | | | |
|---|---|---|---|
| 3,466,433 | 9/1969 | Duda et al. | 364/713 |
| 3,581,078 | 5/1971 | Robertson | 364/827 |
| 3,680,080 | 7/1972 | Maure | 364/713 X |
| 3,996,455 | 12/1976 | Schaefer et al. | 364/713 |
| 4,009,380 | 2/1977 | Bocker et al. | 364/837 |
| 4,074,361 | 2/1978 | Clow | 364/713 |
| 4,084,880 | 4/1978 | Clow | 364/713 X |

OTHER PUBLICATIONS

Tamura et al., "Two-Dimensional Matrix Multiplication Using Coherent Optical Techniques", *Optical Engineering*, vol. 18, No. 2, Mar.-Apr. 1979, pp. 198-204.

*Primary Examiner*—David H. Malzahn
*Attorney, Agent, or Firm*—Peterson, Palmatier, Sturm, Sjoquist & Baker, Ltd.

[57] ABSTRACT

The data processing system makes use of a holographic optical element comprised of a number of facets, each facet containing a grating pattern for diffractively redistributing input light so that output light from a facet or a combination of facets represents encoded mathematical data.

11 Claims, 2 Drawing Figures

U.S. Patent    May 31, 1983    4,386,414
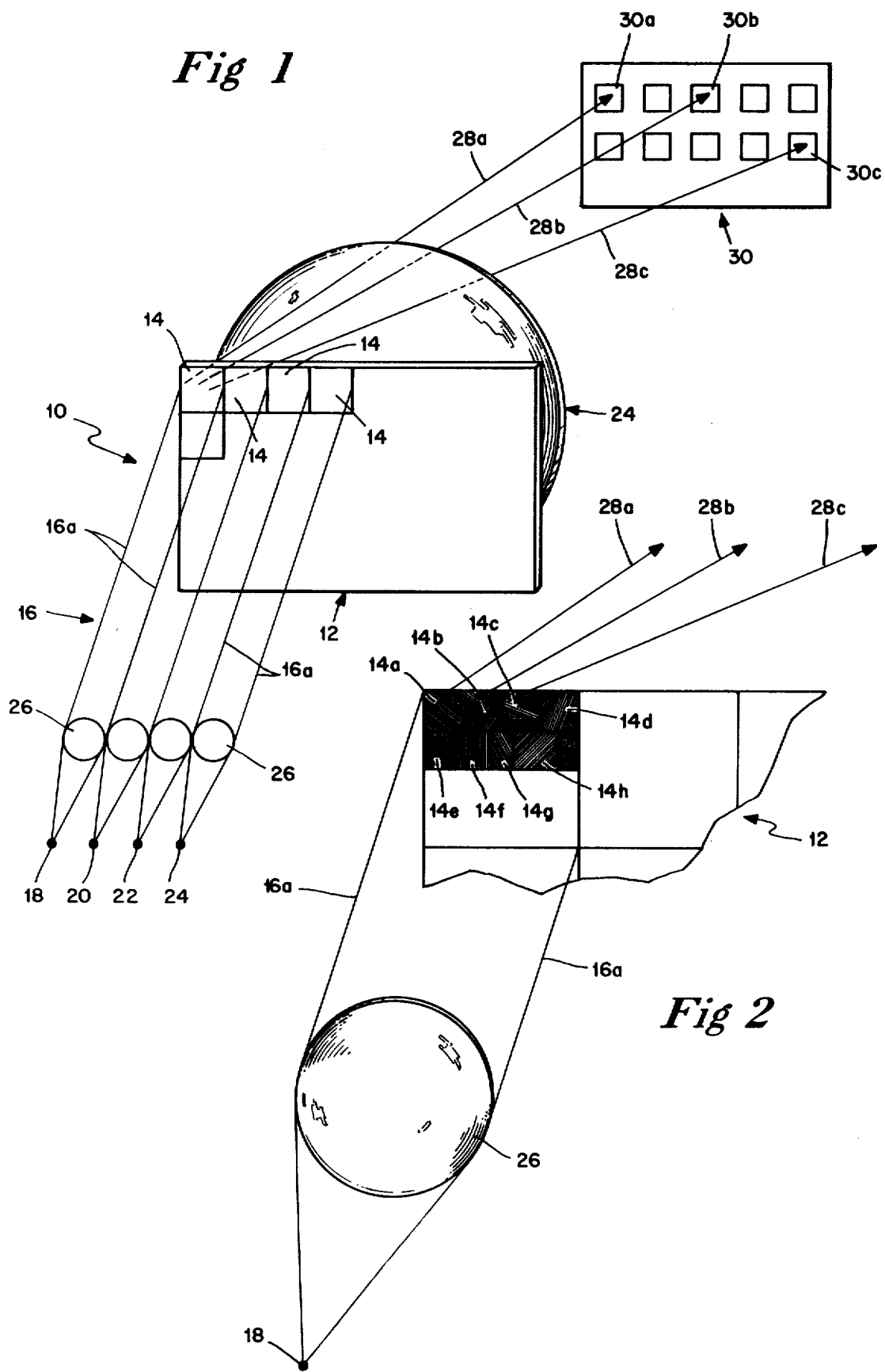

DATA PROCESSING SYSTEM UTILIZING A HOLOGRAPHIC OPTICAL ELEMENT

CROSS REFERENCE TO RELATED APPLICATION

Reference is made to my copending application, filed on July 31, 1980, Ser. No. 174,156, for "MULTI-FACETED HOLOGRAPHIC OPTICAL ELEMENT AND METHODS OF MAKING AND USING SAME".

BACKGROUND OF THE INVENTION

1. Field of the Invention

This invention relates generally to data processing systems, and pertains more particularly to an optical system of this type utilizing a holographic optical element for splitting and redistributing input energy into output energy representative of certain mathematical data.

2. Description of the Prior Art

There are many mathematical operations in which an array of output data is obtained from multiplying an array of input data by a set of fixed numerical values arranged in a matrix. An example of such a vector-matrix multiplication operation would be, for instance, the performance of a discrete Fourier transform on an input vector. Here, an N element input vector would be multiplied by an $M \times N$ matrix to obtain an M element output vector.

Such a multiplication process can, of course, be implemented by a digital computer. Present digital computers, however, carry out operations serially so that if the vector and matrix are large, several minutes of computation might be required. Optical systems, on the other hand, can perform the requisite multiplications in parallel so that the entire operation can be completed in the nanosecond to microsecond time range.

The problem in optical computing is centered around the redistribution of the input light signals so as to provide appropriate output signals. One prior art redistribution method known to me employs fiber optics. Here, one bundle of optical fibers is illuminated by a light source whose intensity represents the value of one of the N numbers in the input vector. The fiber bundle is then divided into M sub-bundles with the number of fibers per sub-bundle being proportional to the values in one column of the matrix. The output ends of the sub-bundles are then located so that each sub-bundle illuminates one of M output detectors. The process is repeated for the other N inputs, each of which sends appropriately proportioned sub-bundles to the M output detectors.

The fiber method is limited because the number of fibers per bundle is relatively small ($\approx 400$) so that the relative light intensity redistribution cannot be performed very accurately. The system is also difficult to replicate because each of the many fibers must be individually connected. Obviously, where vast amounts of data are to be processed, the proper connecting of numerous optical fibers proves to be very costly.

SUMMARY OF THE INVENTION

The optical computing problem, as dealt with in this application, is reduced to finding a suitable method to take the light from N inputs and redistribute it with proper weighting to M outputs.

A general object of my invention is to provide a data processing system utilizing a relatively low cost holographical optical element for the light redistribution.

Another object is to achieve tremendous speed increases in the processing of mathematical data.

Yet another object of my invention is to provide a system for processing data that is quite versatile, rendered so by virtue of the inclusion therein of a readily constructed holographic optical element utilizing individual gratings contained in numerous facets.

Briefly, a holographic optical element when used in the practicing of my invention splits and redistributes the input light energy according to a given mathematical algorithm. In this regard, the holographic optical element constitutes a photographic film that has been divided into numerous facets. The facets themselves are also subdivided so that each sub-facet diffracts light into different areas or regions as far as an output plane is concerned. At the output plane is placed a bank of light detectors, so that whatever light energy strikes the plane due to the diffraction that takes place within the holographic optical element is representative of encoded mathematical output data. Light diffracted from a number of different facets can be directed to a given output area. In this latter situation, the sum of the intensities that are detected in the output plane will constitute the transformed mathematical data.

BRIEF DESCRIPTION OF THE DRAWING

FIG. 1 is a diagrammatic view in perspective exemplifying my system, and

FIG. 2 is a perspective view depicting one of the facets of FIG. 1 which has been greatly enlarged and which has been divided into a number of sub-facets for the purpose of distributing the input light derived from a light emitting diode.

DESCRIPTION OF THE PREFERRED EMBODIMENT

In this description, it will be assumed that it is desired to implement an optical computing system which will multiply an N element input vector by an $M \times N$ matrix to produce M output signals, this being a rather general problem.

In FIG. 1, my system has been denoted generally by the reference numeral 10. Playing a very important role in the practicing of my invention is a holographic optical element indicated in its entirety by the reference numeral 12. Actually, the element 12 is a transformation hologram which splits and distributes light, all as will be more fully explained hereinafter. At this time, though, it is to be perceived that the element 12 is comprised of a number of volume facets 14 which in this example are arranged in horizontal and vertical rows. The width of a facet 14 is on the order of a centimeter or so and the number that have been depicted is only representative of a far greater number (N) of such facets.

At this stage it will be well to refer briefly to FIG. 2. In FIG. 2, only the facet 14 in the upper left-hand corner of the holographic optical element 12 is depicted. It is subdivided into M sub-facets in order to redistribute the input light in accordance with the predetermined mathematical operation (e.g., matrix multiplication) that is desired. Some of these sub-facets have been indicated by the reference characters 14a, 14b, 14c, 14d, 14e, 14f, 14g, 14h, etc.

It will be explained at this point that the input light that is directed onto the hologram or holographic optical element 12 consists of N beams with various intensities which represent the input data. The input light beams or wavefronts have been denoted generally by the reference numeral 16 in FIG. 1. The light 16 is produced from an electronic signal by energizing any or all of N light emitting diodes or it can be achieved optically by passing an enlarged laser beam through a film whose transmittance is proportional to the N input data values. For the sake of illustration, four LEDs 18, 20, 22 and 24 have been depicted, each being associated with one of the four facets 14 shown in the top row. A lens 26, as pictured in FIG. 2, is positioned between each LED 18-24 and the particular facet 14 with which it is positionally associated. It must be borne in mind, though, that a relatively large number of facets 14 are incorporated into the transformation hologram or element 12 and that there is one such LED 18-24 and one lens 26 for each of the N facets 14.

Considering only the upper left-hand facet 14 of FIG. 1, which facet 14 has been enlarged in FIG. 2, it can be seen that in this instance the light impinging on this particular facet from the LED 18, the input light being in the form of the beam 16a, is diffracted by the facet 14 and is split into M parts or angularly separated beams, several of which are illustrated and labeled 28a, 28b, and 28c. The diffraction results from the specific grating patterns that have been recorded in the facet 14, and more specifically by the individual grating components contained in sub-facets 14a-14h, etc. As illustrated in FIG. 2, the gratings within the facets 14a-14h deflect portions of the input light 16a to produce the several angularly related beams 28a-28c which will impinge or strike a target at different spatial locations in output plane 30 which can be a film or an array of detectors. If we assume the plane 30 to contain a detection array, then when the several beams 28a-28c strike or impinge upon the detectors, the light signals provided thereby are detected. The output locations thereof correspond to positions in the M element output data vector.

Owing to the rather small scale of FIG. 1, the upper left-hand facet 14 has been enlarged in FIG. 2, as already explained. Recapitulating, it is only necessary to recognize that the particular facet 14 that is now being examined is actually divided or composed of M sub-facets in order to redistribute the input light from one source in accordance with the appropriate mathematical weighting function. Stated somewhat differently, each sub-facet diffracts light into a different area or at a different location as far as the output plane 30 is concerned. Since the plane 30 has been somewhat arbitrarily considered to constitute a detector array, then, as already explained, the several points or areas labeled 30a, 30b, and 30c represent photo-diodes and are where the angularly related beams 28a, 28b, and 28c are detected.

Having presented the foregoing description, the manner in which my system 10 functions and the benefits to be derived from a practicing of my invention should be readily understood. Nonetheless, a brief operational description should make it clear as to the various advantages that are achievable. It should be understood that my system performs the general mathematical operation of multiplying an N element input vector by an M×N element matrix to arrive at an M element output. The values of the N inputs are represented by the intensities of N light emitting diodes such as the LED 18. Each LED illuminates one of the N facets 14 of the redistribution hologram 12. Each of the N facets is further subdivided into M sub-facets which serve to diffract a fraction of the input light in a given facet into the various M output detectors located in plane 30. The desired fraction of light to be diffracted by each sub-facet is given by the values of the matrix elements in the M×N matrix. The fraction is implemented by area modulating the sub-facets as shown in FIG. 2. That is, a larger sub-facet diffracts a larger fraction of the input optical power to a given output detector. Of course, it is the direction of the output beams, such as those denoted by the numerals 28a-28c that determine the output locations or areas. As shown in FIG. 1, a large lens 24, which is located immediately after hologram 12 and whose focal length is equal to the distance between the lens 24 and the output plane 30, serves to focus the beams 28a, 28b, 28c (and other such output beams that have not been illustrated) onto the small detectors 30a, 30b, 30c (and other such detectors that have not been referred to) located in plane 30.

Each of the M detectors will, in general, receive light from one sub-facet in each of the N facets. The total amount of light received by each of the M output detectors then represents the M output values in the M element output vector.

Inasmuch as the manner of making or constructing facets is fully described in my hereinbefore identified copending application, it is not believed necessary to present a detailed description at this time as to the techniques utilized in the forming of the facets and sub-facets. However, it will be of assistance to point out that each sub-facet 14a-14h etc., is exposed to a coherent object beam and a coherent reference beam, these beams successively impinging upon the photographic film at each surface each of a particular sub-facet. The various sub-facets and facets collectively constitute the holographic optical element 12 used in the practicing of my invention.

Several techniques are possible to record the variable area sub-facets. The first technique is to use an exposure mask (whose purpose is more fully described in my copending application) in which the aperture size can be varied under computer control. Thus various size sub-facets can be recorded by exposure through the open area of the mask. Alternately, a mask with fixed open area $A_o$ corresponding to the size of the smallest desired sub-facet can be used. Larger sub-facets are then constructed by recording several of these small areas $A_o$ next to each other such that they all contain identical gratings to diffract light to the same output location.

As already mentioned in my copending application, the advantage of using the interferometric recording process to construct the redistribution hologram 12 is that the hologram can be recorded in a volume phase film such as dichromated gelatin. Such holograms can have nearly 100% diffraction efficiency which leads to high signal-to-noise ratios for optical computing systems. Such holograms can also be easily replicated by optical means.

An alternate technique, that is, to use computer generated holograms for the redistribution hologram 12 is also within the scope of the invention. Computer generated holograms would have one advantage over interferometrically recorded volume holograms in that the sub-facet areas could be much more easily varied and controlled. Thin, phase, square wave gratings, such as those recorded in photoresist, would be most suitable for this application because their diffraction efficiency can reach 40%.

I claim:

1. In a data processing system, a holographic optical element formed with a plurality of adjoining facets, each facet containing grating patterns representing encoded mathematical data for diffractively redistributing input light so that output light from each facet represents said mathematical data.

2. A data processing system in accordance with claim 1 in which said input light is in the form of a light beam and said output light is in the form of a plurality of angularly related output light beams.

3. A data processing system in accordance with claim 2 including planar means forming a plane on which said angularly related output beams impinge.

4. A data processing system in accordance with claim 3 in which said planar means includes light-sensitive means disposed in said plane which said angularly related output beams strike.

5. A data processing system in accordance with claim 4 in which said light-sensitive means comprises an array of photo-diodes for detecting the output beams.

6. A data processing system in accordance with claim 1 in which said holographic optical element constitutes a photographic film, said facets being arranged in horizontal and vertical rows thereon.

7. A data processing system in accordance with claim 6 in which each facet is sub-divided into a plurality of sub-facets having a grating representing a portion of said encoded mathematical data recorded therein, all of the sub-facets redistributing some of the input light as output light so that said output light represents the mathematical data recorded in said sub-facets.

8. A data processing system in accordance with claim 1 including means for producing said input light in the form of a plurality of light beams, and means for directing each of said light beams onto a particular facet.

9. In a data processing system, a holographic optical element formed with a plurality of adjoining facets, each facet containing grating patterns representing encoded mathematical data for diffractively redistributing input light so that output light from each facet represents said mathematical data, a light emitting diode for each of said facets, said light emitting diodes providing said input light, and a plurality of photo-diodes for detecting said output light.

10. A data processing system in accordance with claim 9 in which at least one of said facets includes a number of sub-facets, each sub-facet representing a portion of said encoded mathematical data, and said photo-diodes are positioned to receive output light from said sub-facets.

11. A data processing system in accordance with claim 10 including a lens between each light emitting diode and the facet for which the diode provides input light, and an additional lens between said holographic element and said photo-diodes for focusing output light from said sub-facets onto certain of said photo-diodes.

* * * * *